(12) United States Patent
Aono (10) Patent No.: US 8,289,013 B2
(45) Date of Patent: *Oct. 16, 2012

(54) SPEED DETECTOR AND SERVOMOTOR

(75) Inventor: Ryuji Aono, Numazu (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 1775 days.

This patent is subject to a terminal disclaimer.

(21) Appl. No.: 11/465,382

(22) Filed: Aug. 17, 2006

(65) Prior Publication Data

US 2007/0198200 A1 Aug. 23, 2007

(30) Foreign Application Priority Data

Aug. 22, 2005 (JP) ................................ 2005-240284

(51) Int. Cl.
*G01P 3/42* (2006.01)
(52) U.S. Cl. ........................................ 324/160; 702/142
(58) Field of Classification Search .................. 324/160, 324/173–174; 702/142
See application file for complete search history.

(56) References Cited

U.S. PATENT DOCUMENTS

| | | | |
|---|---|---|---|
| 5,752,092 A | 5/1998 | Ohishi et al. | |
| 6,591,217 B1 | 7/2003 | Baur et al. | |
| 7,064,538 B2 * | 6/2006 | Kernhof | 324/207.25 |
| 7,606,852 B2 * | 10/2009 | Maharatna et al. | 708/441 |
| 7,668,689 B2 * | 2/2010 | Aono | 702/142 |
| 2004/0207392 A1 | 10/2004 | Kernhof | |
| 2006/0145648 A1 | 7/2006 | Fujita et al. | |
| 2007/0198200 A1 | 8/2007 | Aono | |
| 2008/0111516 A1 | 5/2008 | Inokuma | |

FOREIGN PATENT DOCUMENTS

| | | |
|---|---|---|
| DE | 10 2006 039 176 | 5/2007 |
| JP | 62-211505 | 9/1987 |
| JP | 2001-308943 | 11/2001 |
| JP | 2003-513229 | 4/2003 |
| JP | 2007-57269 | 3/2007 |
| KR | 1999-0085924 | 12/1999 |
| KR | 10-2006-0071895 | 6/2006 |
| WO | WO 01/11375 | 2/2001 |

(Continued)

OTHER PUBLICATIONS

Sugimoto, Hidehiko et al.; "Facts of Logic and Design of AC Servo System"; pp. 142-149; Sogou Densi Shuppan Corp., Japan.

(Continued)

*Primary Examiner* — Bot Ledynh
(74) *Attorney, Agent, or Firm* — DLA Piper LLP US (57) ABSTRACT

This disclosure concerns a speed detector sampling coordinates showing the position of a moving body and detecting the speed thereof includes a memory storing preset tentative angles and the values of a trigonometric function corresponding to the tentative angles; a first register storing the first coordinates of the moving body obtained by a first sampling; a second register storing the actual second coordinates of the moving body obtained by a second sampling subsequent to the first sampling; and an arithmetic operation unit calculating second coordinates in calculation, which are shown by multiplication, addition, or subtraction of the first coordinates and the values of the trigonometric function, to approximate the second coordinates in calculation to the actual second coordinates, the arithmetic operation unit calculating the speed of the moving body based on the tentative angle corresponding to the value of the trigonometric function used to the second coordinates in calculation.

2 Claims, 5 Drawing Sheets

FOREIGN PATENT DOCUMENTS

WO    WO 2005/073841    8/2005

OTHER PUBLICATIONS

Office Action issued in counterpart Korean Application No. 10-200678582, dated Aug. 23, 2007, accompanied by an English language translation.

Japanese Office Action issued in JP 2005-240284 mailed on Jun. 2, 2011.

English Translation of Japanese Office Action issued in JP 2005-240284 mailed on Jun. 2, 2011.

Office Action issued in Japanese Appl 2005-240284 on Apr. 1, 2011.

English Translation of Office Action issued in Japanese Appl 2005-240284 on Apr. 1, 2011.

English Abstract of JP 2003513229 published Apr. 8, 2003.

English Translation of JP 2003513229 published Apr. 8, 2003.

English Translation of KR 1999-0085924 published Dec. 15, 1999.

International Search Report issued in PCT/JP2009/058739 on Aug. 11, 2009.

English Abstract of JP 2007-57269 published Mar. 8, 2007.

English Translation of JP 2007-57269 published Mar. 8, 2007.

English Abstract of JP 62-211505 published Sep. 17, 1987.

International Preliminary Report on Parentability & Written Opinion issued in PCT/JP2009/058739 on Jan. 20, 2011.

Office Action issued in Korean Application 10-2007-124972 on Jul. 29, 2009.

English Language Translation of Office Action issued in Korean Application 10-2007-124972 on Jul. 29, 2009.

Duprat J., Muller J.-M: The CORDIC Algorithm: New Results fur Faist VLSI huplementation. In: IEEE Transactions on Computers, vol. 42, No. 2, Feb. 1993, S. 168-178.

Related U.S. Appl. No. 11/949,816 electronically captured on May 29, 2012.

Related U.S. Appl. No. 12/989,563 electronically captured on May 29, 2012.

German Office Action issued in DE 11 2009 000846 on Apr. 3, 2012.

English Language Translation of German Office Action issued in DE 11 2009 000846 on Apr. 3, 2012.

Abstract of DE 102006039176 with English Language Translation (see page 2 of document).

H. Sugimoto et al., "Fact of the Theory and Design for AC Servo-System", pp. 142-149 (1990).

English language translation of H. Sugimoto et al., "Fact of the Theory and Design for AC Servo-System", pp. 142-149 (1990).

English Language Abstract of JP 2006-201148 Published Aug. 3, 2006 (corresponds to KR 10-2006-0071895 published Jun. 27, 2006).

English Language Translation of Office Action issued in German Appl 10 2007 057 476 on Nov. 16, 2009.

Office Action issued in German Appl 10 2007 057 476 on Nov. 16, 2009.

Sakai et al., A Servo Method for a Large-Capacity Floppy Disk Drive with Downward Compatibility, Sep. 1989, IEEE Transactions on Magnetics, vol. 25, No. 5, pp. 3375-3377.

English Language Abstract of JP 2001-308943 published on Nov. 2, 2001.

English Language Translation of JP 2001-308943 published on Nov. 2, 2001.

\* cited by examiner

| TARGET | PREVIOUS TIME | DISCRIMINATION FORMULA | ROTATING DIRECTION TRUE | ROTATING DIRECTION FALSE |
|---|---|---|---|---|
| V | I | — | CW | CCW |
|  | II | — |  | CCW |
|  | III | — |  | CCW |
|  | IV | — |  | CCW |
|  | V | $|y2| > |yc_{i-1}|$ | CCW | CW |
|  | VI | — |  | CW |
|  | VII | — |  | CW |
|  | VIII | — |  | CW |
| VI | I | — |  | CW |
|  | II | — |  | CCW |
|  | III | — |  | CCW |
|  | IV | — |  | CCW |
|  | V | — |  | CCW |
|  | VI | $|x2| > |xc_{i-1}|$ | CW | CCW |
|  | VII | — |  | CW |
|  | VIII | — |  | CW |
| VII | I | — |  | CW |
|  | II | — |  | CW |
|  | III | — |  | CCW |
|  | IV | — |  | CCW |
|  | V | — |  | CCW |
|  | VI | — |  | CCW |
|  | VII | $|x2| > |xc_{i-1}|$ | CCW | CW |
|  | VIII | — |  | CW |
| VIII | I | — |  | CW |
|  | II | — |  | CW |
|  | III | — |  | CW |
|  | IV | — |  | CCW |
|  | V | — |  | CCW |
|  | VI | — |  | CCW |
|  | VII | — |  | CCW |
|  | VIII | $|y2| > |yc_{i-1}|$ | CW | CCW |

| TARGET | PREVIOUS TIME | DISCRIMINATION FORMULA | ROTATING DIRECTION TRUE | ROTATING DIRECTION FALSE |
|---|---|---|---|---|
| I | I | $|y2| > |yc_{i-1}|$ | CCW | CW |
|  | II | — |  | CW |
|  | III | — |  | CW |
|  | IV | — |  | CW |
|  | V | — |  | CCW |
|  | VI | — |  | CCW |
|  | VII | — |  | CCW |
|  | VIII | — |  | CCW |
| II | I | — |  | CW |
|  | II | $|x2| > |xc_{i-1}|$ | CW | CCW |
|  | III | — |  | CW |
|  | IV | — |  | CW |
|  | V | — |  | CCW |
|  | VI | — |  | CCW |
|  | VII | — |  | CCW |
|  | VIII | — |  | CCW |
| III | I | — |  | CW |
|  | II | — |  | CW |
|  | III | $|x2| > |xc_{i-1}|$ | CCW | CW |
|  | IV | — |  | CW |
|  | V | — |  | CCW |
|  | VI | — |  | CCW |
|  | VII | — |  | CCW |
|  | VIII | — |  | CCW |
| IV | I | — |  | CW |
|  | II | — |  | CW |
|  | III | — |  | CW |
|  | IV | $|y2| > |yc_{i-1}|$ | CW | CCW |
|  | V | — |  | CW |
|  | VI | — |  | CW |
|  | VII | — |  | CW |
|  | VIII | — |  | CW |

SPEED DETECTOR AND SERVOMOTOR

CROSS-REFERENCE TO RELATED APPLICATION

This application is based upon and claims the benefit of priority from the prior Japanese Patent Applications No. 2005-240284, filed on Aug. 22, 2005, the entire contents of which are incorporated herein by reference.

BACKGROUND OF THE INVENTION

1. Field of the Invention

The present invention relates to a speed detection device and a servomotor.

2. Related Art

In the motion control of servomotors, a position detector outputs a sine signal and a cosine signal based on the moving distance of a machine or on the moving angle of a shaft. An arithmetic operation circuit of the position detector makes samplings of sine signals and cosine signals every unit time and calculates a moving speed or an angular speed from a difference of distances or angles between two samples and from a time interval of the sampling.

Figure 8A:
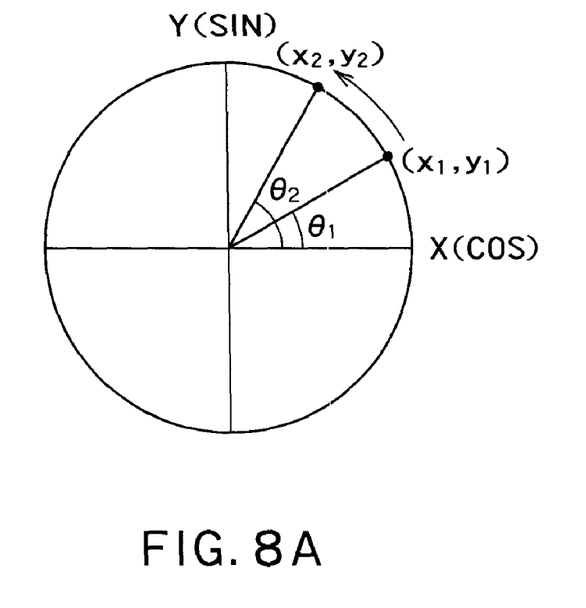
FIGS. 8A and 8B show coordinates obtained by using a conventional technique.
Figure 8B:
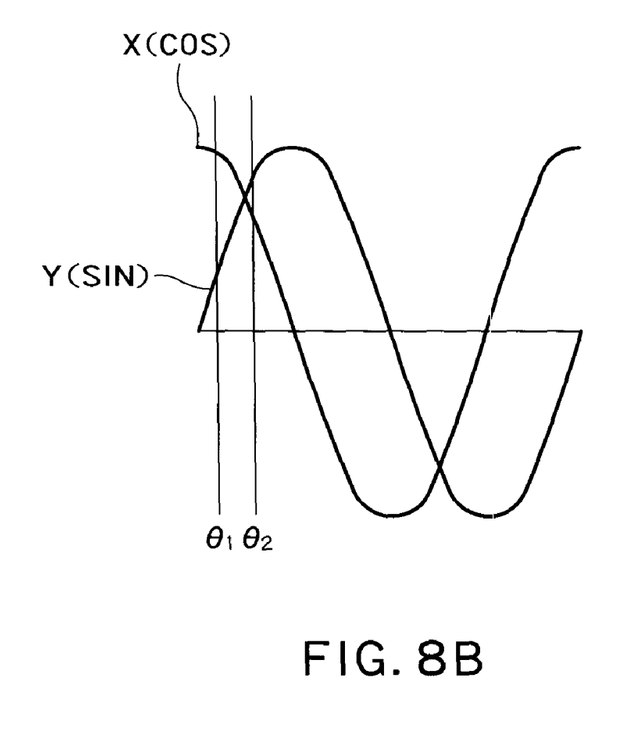

As shown in, for example, FIGS. 8A and 8B, when coordinates obtained by samplings carried out twice are shown by (x1, y1) and (x2, y2) and the time interval of sampling is shown by t(sec), the angular speed ω (rad/sec) is shown by Expression 1. "sec" means second and "rad" means radian.

$$\omega = (\theta2 - \theta1)/t = (\tan^{-1}(y2/x2) - \tan^{-1}(y1/x1))/t \quad \text{(Expression 1)}$$

Here, θ1(rad) and θ2(rad) are absolute angles (deflection angles) at the times of the two samplings. "tan" means tangent. As shown in Expression 1, to obtain the angular speed ω, the deflection angles must be calculated from the coordinates ("Facts of Logic and Design of AC Servo System" ("AC servo system no riron to sekkei no jissai"), Hidehiko Sugimoto et al, p 142-p 149, Sogou Densi Shuppan Corp.)).

To cope with the above problem, it is contemplated to use a CPU or a custom LSI (Large-Scale Integrated circuit) as an arithmetic operation circuit and to realize the operation of Expression 1 by a digital logic circuit.

However, the arctangent ($\tan^{-1}$) requires division of sine/cosine. The following two problems arise in the calculation of the arctangent. One of the problems resides in that the absolute value of the value of a tangent (cosine/sine) greatly increases as a cosine signal located on a unit circle more approaches to zero. As a result, the error resulting from the arctangent greatly increases.

The other of the problems resides in that the division (cosine/sine) is necessary to obtain an arctangent and a tangent. Division is a circuit which cannot be easily realized by a digital circuit, and thus a large-scale digital circuit must be used to realize division as compared with multiplication and addition.

Accordingly, there are desired a speed detection circuit and a servomotor that can detect a moving speed or an angular speed by a small arithmetic operation circuit with pinpoint accuracy.

SUMMARY OF THE INVENTION

A speed detection device according to an embodiment of the present invention, the device periodically sampling coordinates showing the position of a moving body which carries out a rotating motion or a reciprocating motion and detecting the speed of the moving body based on the coordinates comprise: a memory storing a plurality of preset tentative angles and the values of a trigonometric function corresponding to the plurality of tentative angles; a first register storing the first coordinates of the moving body obtained by a first sampling; a second register storing the actual second coordinates of the moving body obtained by a second sampling subsequent to the first sampling; and an arithmetic operation unit calculating second coordinates in calculation, which are shown by multiplication, addition, or subtraction of the first coordinates and the values of the trigonometric function, to approximate the second coordinates in calculation to the actual second coordinates, the arithmetic operation unit calculating the speed of the moving body based on the tentative angle corresponding to the value of the trigonometric function used to the second coordinates in calculation.

A servomotor according to an embodiment of the present invention, the servomotor periodically sampling coordinates showing the position of a moving body which carries out a rotating motion or a reciprocating motion and detecting the speed of the moving body based on the coordinates comprises: a memory storing a plurality of preset tentative angles and the values of a trigonometric function corresponding to the plurality of tentative angles; a first register storing the first coordinates of the moving body obtained by a first sampling; a second register storing the actual second coordinates of the moving body obtained by a second sampling subsequent to the first sampling; and an arithmetic operation unit calculating second coordinates in calculation, which are shown by multiplication, addition, or subtraction of the first coordinates and the values of the trigonometric function, to approximate the second coordinates in calculation to the actual second coordinates, the arithmetic operation unit calculating the speed of the moving body based on the tentative angle corresponding to the value of the trigonometric function used to the second coordinates in calculation.

DETAILED DESCRIPTION OF THE INVENTION

An embodiment according to the present invention will be described below with reference to the drawings. However, the embodiment by no means restricts the present invention.

Figure 1:
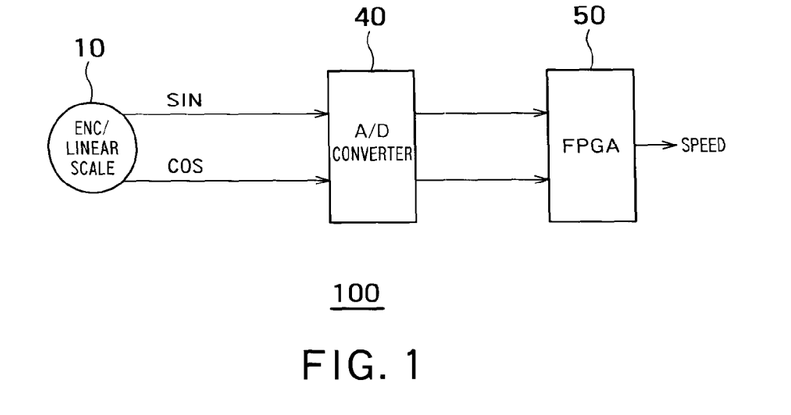
FIG. 1 is a block diagram showing a speed detection device 100 of the embodiment according to the present invention.

FIG. 1 is a block diagram showing a speed detection device 100 of the embodiment according to the present invention. The speed detection device 100 includes a rotary encoder or linear scale 10, an A/D converter 40, and an arithmetic operation unit 50. The arithmetic operation unit 50 is a general-purpose CPU or a custom LSI. The arithmetic operation unit 50 may be, for example, an FPGA (Field Programmable Gate Array). The speed detection device 100 may be mounted on a servomotor having a moving body that carries out a rotating motion or a reciprocating motion. The moving body is, for example, a rotor of a servomotor mounted on a machine tool, a reciprocating arm of the machine tool, and the like.

The rotary encoder or linear scale 10 outputs signals of coordinates (sin, cos) showing the position of the moving body that carries out the rotating motion or the reciprocating portion. Here, "sin" indicates sine and "cos" indicates cosine. The A/D converter 40 converts the sine signal and the cosine signal from the rotary encoder or linear scale 10 to a digital signal. Further, the arithmetic operation unit 50 receives digital signals based on the sine signal and the cosine signal from the A/D converter 40 and calculates the angular speed or the speed of the moving body.

Although the arithmetic operation unit 50 may be the FPGA, any other arbitrary LSI may be used in place of the FPGA. Further, the arithmetic operation unit 50 may be realized by a general-purpose CPU and software.

Figure 2:
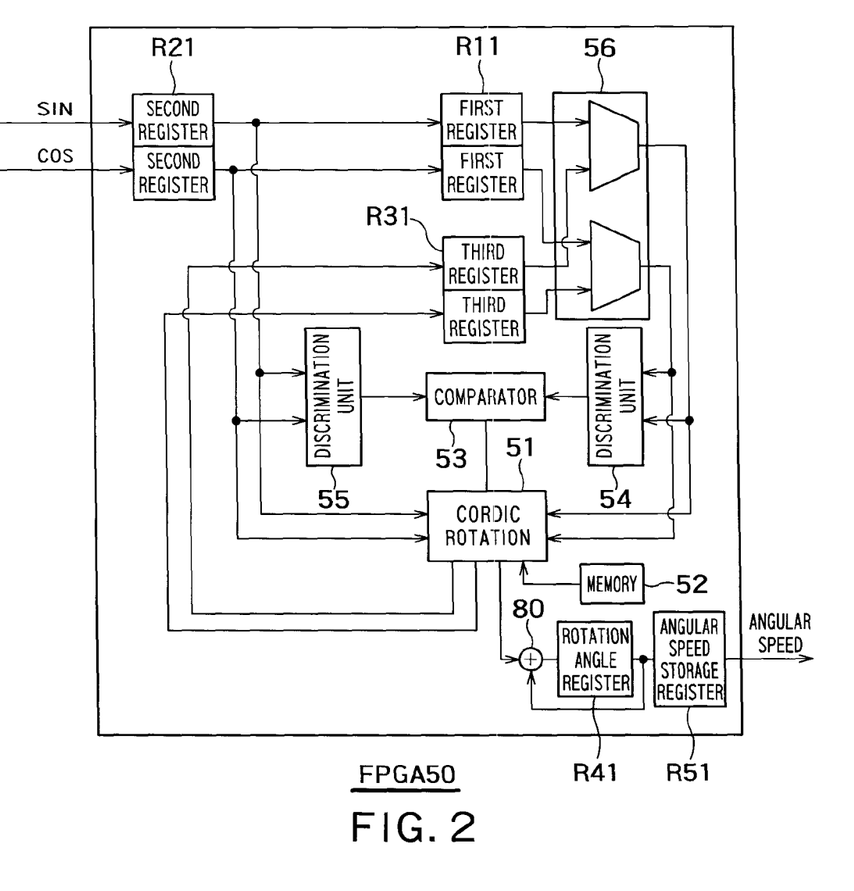
FIG. 2 is a block diagram showing the internal arrangement of the arithmetic operation unit 50.

FIG. 2 is a block diagram showing the internal arrangement of the arithmetic operation unit 50. The arithmetic operation unit 50 includes a CORDIC rotation 51, a memory 52, a comparator 53, discrimination units 54, 55, a selection unit 56, a first resister R11, a second register R21, a third register R31, an angle cumulation resister R41 as a fourth register, an angular speed storage register R51, and an adder 80.

A process for calculating the angular speed from the sine signal and the cosine signal will be explained with reference to FIG. 2. A CORDIC (Coordinate Rotation Digital Computer) algorithm is used to calculate the angular speed. The CORDIC algorithm includes a vectoring mode and a rotation mode. The embodiment uses the rotation mode. The CORDIC algorithm is included in the arithmetic operation unit 50 and realized by a logic circuit.

In the embodiment, to make understanding easy, it is assumed that when the rotor as the moving body rotates once, the rotary encoder 10 outputs a sine wave and a cosine wave of one cycle. The speed detection device 100 periodically samples the coordinates of the rotor during one cycle. The speed detection device 100 obtains the two-dimensional coordinates (Euclidean coordinates) (x1, y1) of the rotor in a first sampling and obtains the two-dimensional coordinates (x2, y2) of it in a second sampling carried out in a predetermined time after the first sampling (x1 and x2 are sine values and y1 and y2 are cosine values). The speed detection device 100 calculates the angle φ from the position of the rotor in the first sampling to the position of it in the second sampling based on the coordinates (x1, y1) and the coordinates (x2, y2) by the CORDIC algorithm. Since the sampling is carried out periodically, when the angle 4 is found, the angular speed of the rotor can be obtained.

The memory 52 stores plural preset tentative angles $\phi_0$–$c_n$ ($\phi_0 > \phi_1 > \phi_2 > \ldots \phi_n$) (n: natural numbers) and cos $\phi_0$–cos $\phi_n$ and tan $\phi_0$–tan $\phi_n$ that are the values of a trigonometric function to the plural tentative angles. In the initial state of the speed detection device 100, the first to third registers store no particular value.

First, the arithmetic operation unit 50 receives the first coordinates (x1, y1)=(sin θ, cos θ) of the rotor obtained by the first sampling from the A/D converter 40 as digital values. The first coordinates are stored in the second register R21.

At first, the first and third resisters R11 and R31 are indefinite. Values calculated at the time are eliminated because they are calculated based on indefinite values.

Next, the arithmetic operation unit 50 carries out the second sampling in a next cycle. The arithmetic operation unit 50 receives the actual second coordinates (x2, y2)=(sin(θ+φ), cos(θ+φ)) of the rotor obtained by the second sampling from the A/D converter 40 as digital values. The second coordinates (sin(θ+φ), cos(θ+φ)) are stored in the second register R21. At the time, the first resister R11 stores the first coordinates (sin θ, cos θ).

Figure 3:
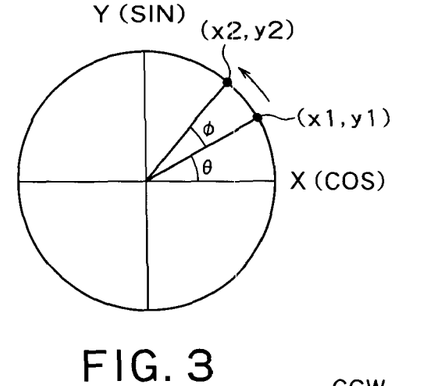
FIG. 3 is a view showing the positional relation between the first coordinates and the actual second coordinates.

FIG. 3 is a view showing the positional relation between the first coordinates (sin θ, cos θ) and the actual second coordinates (sin(θ+φ), cos(θ+φ)). As shown in FIG. 3, the actual second coordinates (sin(θ+φ), cos(θ+φ)) are actual coordinates when the rotor is rotated by φ with respect to the first coordinates (sin θ, cos θ). Note that θ and φ are shown in the unit of radian (rad). On the sheet of FIG. 3, the rotor rotates counterclockwise (CCW) (in the direction of an arrow in FIG. 3).

Since the third register R31 is indefinite when the second coordinates are received, the selection unit 56 of FIG. 2 selects the first resister R11 and supplies the first coordinates (sin θ, cos θ) to the discrimination unit 54 and the CORDIC rotation 51. In contrast, the second register R21 supplies the actual second coordinates (sin(θ+φ), cos(θ+φ)) to the discrimination unit 55 and the CORDIC rotation 51.

The CORDIC rotation 51 calculates second coordinates in calculation ($xc_i$, $yc_i$) using the first coordinates (x1, y1)=(sin θ, cos θ) and the values of the trigonometric function cos $\phi_0$ to cos $\phi_n$, tan $\phi_0$ to tan $\phi_n$ from the memory 52. The second coordinates in calculation ($xc_i$, $yc_i$) are coordinates that are repeatedly calculated so that they are converged to the actual second coordinates ($X_2$, $y_2$) when the CORDIC rotation 51 finds the angle φ.

The third register R31 stores the second coordinates in calculation ($xc_i$, $yc_i$) while the calculation is being carried out. The discrimination unit 55 discriminates the region to which the actual second coordinates stored in the second register R21 belong. The discrimination unit 54 discriminates the region to which the first coordinates selected by the selection unit 56 or the second coordinates in calculation belong. The second coordinates in calculation ($xc_i$, $yc_i$) can be shown as Expression 1 or 2. The comparator 53 selects any of Expression 1 and Expression 2 based on the results of discrimination of the discrimination units 54 and 55. The CORDIC rotation 51 carries out the operation of Expression 1 or Expression 2 based on the result of comparison of the comparator 53.

$$xc_i = \cos \phi_i * (xc_{i-1} - yc_{i-1} * \tan \phi_i)$$

$$yc_i = \cos \phi_i * (yc_{i-1} + xc_{i-1} * \tan \phi_i) \quad \text{(Expression 1)}$$

or $$xc_i = \cos \phi_i * (xc_{i-1} + yc_{i-1} * \tan \phi_i)$$

$$yc_i = \cos \phi_i * (yc_{i-1} - xc_{i-1} * \tan \phi_i) \quad \text{(Expression 2)}$$

where, $\phi_i = \tan^{-1} 2^{-i}$ (i=0, 1, 2 ... n), and when i=0, $xc_{i-1}$=x1, $yc_{i-1}$=y1.

Expression 1 and Expression 2 will be explained. First, the first coordinates and the actual second coordinates can be shown by Expressions 3 to 6.

$$x1 = \cos \theta \quad \text{(Expression 3)}$$

$$y1 = \sin \theta \quad \text{(Expression 4)}$$

$$x2 = \cos(\theta + \phi) \quad \text{(Expression 5)}$$

$$y2 = \sin(\theta + \phi) \quad \text{(Expression 6)}$$

When Expressions 5 and 6 are modified using the addition theorem of the trigonometric function, they are made to Expressions 7 and 8.

$$x2 = \cos\theta \cdot \cos\phi - \sin\theta \cdot \sin\phi \quad \text{(Expression 7)}$$

$$y2 = \sin\theta \cdot \cos\phi + \cos\theta \cdot \sin\phi \quad \text{(Expression 8)}$$

When Expressions 3 and 4 are substituted for Expressions 7 and 8 and modified, Expressions 9 and 10 can be obtained.

$$x2 = \cos\phi(x1 - y1 \cdot \tan\phi) \quad \text{(Expression 9)}$$

$$y2 = \cos\phi(y1 + x1 \cdot \tan\phi) \quad \text{(Expression 10)}$$

The CORDIC algorithm is used here. In more detail, the value of $\tan\phi$ is limited to $\pm 2^{-1}$ as shown in Expression 11. The $\tan\phi$ restricted as described above is shown as $\tan\phi i$.

$$\tan\phi i = \pm 2^{-1} = \pm 1, \pm 2^{-1}, \pm 2^{-2}, \ldots (i=0,1,2,\ldots n) \quad \text{(Expression 11)}$$

At the time, the value set as $\phi i$ is restricted as shown in Expression 12. The $\phi i$ is a discrete value and called a "tentative angle $\phi i$" below.

$$\phi i = \tan^{-1}(\pm 2^{-1}) = \pm 0.78 \text{ rad}, \pm 0.46 \text{ rad}, \pm 0.25 \text{ rad}, \pm 0.12 \text{ rad} \quad \text{(Expression 12)}$$

Further, when $\tan\phi i$ is determined as in Expression 11, $\cos\phi i$ is naturally determined as in Expression 13.

$$\cos\phi i = \cos(\tan^{-1}(\pm 2^{-1})) = 0.71, 0.89, 0.97, 0.99 \quad \text{(Expression 13)}$$

When the tentative $\phi i$ is substituted for Expressions 9 and 10, the second coordinates in calculation can be obtained. Note that Expression 1 is established when the tentative angle $\phi i$ is positive, and Expression 2 is established when the tentative angle $\phi i$ is negative.

The discrete numerals corresponding to the respective values of i shown in Expressions 11 to 13 are previously set and stored in the memory 52. That is, the memory 52 stores the respective values of tentative angle $\phi i$ and the values of the trigonometric function $\tan\phi i$, $\cos\phi i$ to the respective values of the tentative angle $\phi i$. The CORDIC rotation 51 obtains the tentative angle $\phi i$ based on Expression 1 or 2 referring to the values shown in Expressions 11 to 13 and stored in the memory 52.

The CORDIC rotation 51 calculates the second coordinates in calculation $(xc_i, yc_i)$ shown in Expression 1 or 2 as to the respective values of i in the order of i=0, 1, 2 . . . .

The CORDIC rotation 51 calculates Expressions 1 or 2 so that the second coordinates in calculation $(xc_i, yc_i)$ approach the actual second coordinates (x2, y2). To move the second coordinates in calculation $(xc_i, yc_i)$ in CCW direction, the CORDIC rotation 51 uses Expression 1. To move the second coordinates in calculation $(xc_i, yc_i)$ in clockwise (CW) direction, the CORDIC rotation 51 uses Expression 2. As a result, the second coordinates in calculation $(xc_i, yc_i)$ can be converged to the actual second coordinates (x2, y2) as shown in FIG. 4.

In the conversion calculation process described above, the angle obtained by cumulating the tentative angles $\pm\phi i$ is a rotation angle to be found.

Figure 4:
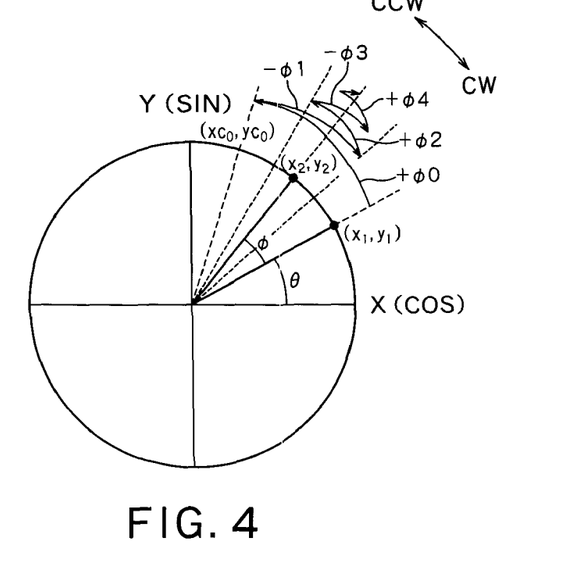
FIG. 4 shows a conceptual view when the second coordinates in calculation are converted to the actual second coordinates.

FIG. 4 shows a conceptual view when the second coordinates in calculation $(xc_i, yc_i)$ are converted to the actual second coordinates (x2, y2). The CORDIC rotation 51 first obtains second coordinates in calculation $(xc_0, yc_0)$ by substituting the first coordinates (x1, y1) for $(xc_{i-1}, yc_{i-1})$ and substituting the values of Expressions 11 to 13 where i=0 for Expression 1. At the time, the selection unit 56 of FIG. 2 selects the first resister R11 and supplies the first coordinates (x1, y1) to the CORDIC rotation 51 and to the discrimination unit 54. The CORDIC rotation 51 uses Expression 1. A method used by the comparator 53 to select Expression 1 will be described later. The second coordinates in calculation $(xc_0, yc_0)$ are coordinates when they are rotated from the first coordinates (x1, y1) to the second coordinates (x2, y2) in CCW direction by $\phi_0$. The second coordinates in calculation $(xc_0, yc_0)$ are stored in the third register R31 of FIG. 2 after they are calculated. Here, the initial tentative angle $+\phi_0$ or $-\phi_0$ is stored in the rotation angle storage register R41.

Next, the CORDIC rotation 51 obtains second coordinates in calculation $(xc_i, yc_i)$ by substituting the second coordinates in calculation $(xc_0, yc_0)$ and the values of Expressions 11 to 13 where i=1 for Expression 2. At the time, the selection unit 56 of FIG. 2 selects the third resister R31 and supplies the second coordinates in calculation $(xc_0, yc_0)$ to the CORDIC rotation 51 and to the discrimination unit 54. The CORDIC rotation 51 uses Expression 2. A method used by the comparator 53 to select Expression 2 will be described later. The second coordinates in calculation $(xc_1, yc_i)$ are coordinates when they are rotated from the second coordinates in calculation $(xc_0, yc_0)$ to the actual second coordinates (x2, y2) in CW direction by $\phi 1$. Here, the adder 80 adds the tentative angle $+\phi_1$ or $-\phi_1$ to the tentative angle $+\phi_0$ or $-\phi_0$ stored in the rotation angle storage register R41 and returns the result of addition to the rotation angle storage register R41.

The CORDIC rotation 51 repeats the same calculation as to i=3, 4, . . . . As shown in Expression 12, since an increase of i decreases the value of the tentative angle $\phi i$, the second coordinates in calculation $(xc_i, yc_i)$ are converged to the actual second coordinates (x2, y2). At the time, the second coordinates in calculation $(xc_i, yc_i)$ are stored in the third register R31 and supplied to the CORDIC rotation 51 and to the discrimination unit 54 when next second coordinates in calculation $(xc_{i+1}, yc_{i+1})$ are calculated.

The adder 80 adds the tentative angle $+\phi_i$ or $-\phi_i$ to the tentative angle $+\phi_{i-1}$ or $-\phi_{i-1}$ stored in the rotation angle storage register R41 and returns the result of addition to the rotation angle storage register R41. As described above, the adder 80 cumulates the tentative angles $\pm\phi_0, \pm\phi_1, \pm\phi_2, \ldots \pm\phi_i$, and the rotation angle storage register R41 keeps the cumulated tentative angles. When the tentative angle $\phi_i$ is converged, the angle stored in the rotation angle storage register R41 is the rotation angle $\phi$ from the actual first coordinates to the second actual coordinates.

The series of calculation are carried out from a second sampling to a third sampling. That is, the CORDIC rotation 51 converges the second coordinates in calculation $(xc_i, yc_i)$ to the actual second coordinates (x2, y2) during one cycle. With this operation, the rotation angle $\phi$ from the actual first coordinates to the actual second coordinates can be obtained.

With this operation, the CORDIC rotation 51 can obtain an actual rotation angle $\phi$ every sampling. The period of one cycle in sampling is a preset period. Accordingly, the speed detection device 100 can obtain the angular speed by the tentative angle $\phi i$ that is equal to the actual angle $\theta+\phi$ obtained every sampling or approaches the actual angle $\theta+\phi$. The speed detection device 100 outputs the angular speed.

The method by which the comparator 53 select Expression 1 or 2 will be explained.

Figure 5:
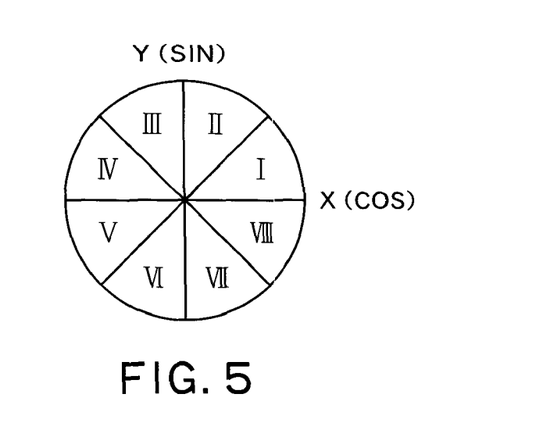
FIG. 5 is a view showing eight regions to which coordinates are divided.
Figure 6:
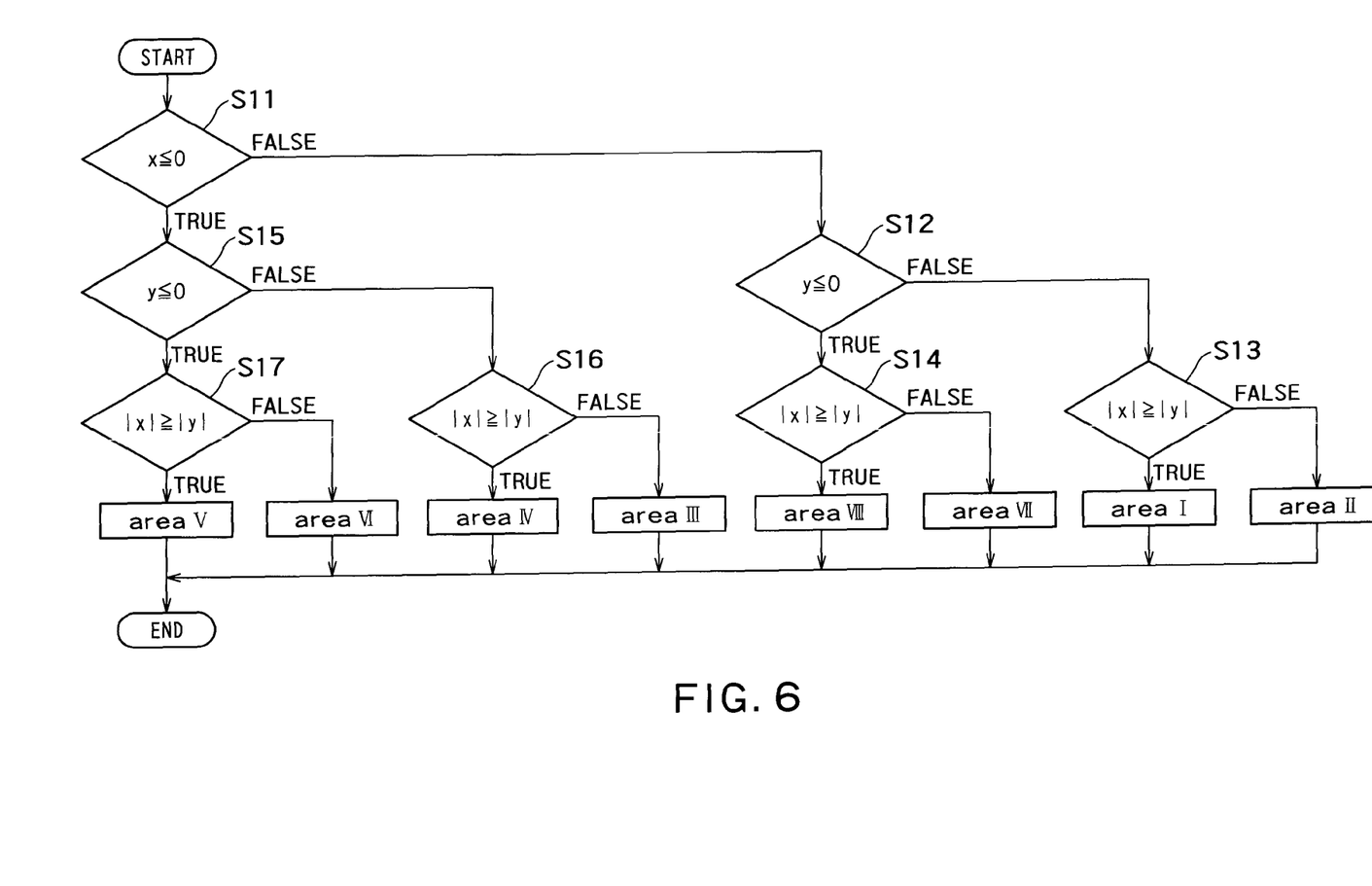
FIG. 6 is a flowchart for discriminating to which of the regions I to VIII certain coordinates (x, y) belong.

FIG. 5 is a view showing eight regions to which coordinates are divided. FIG. 6 is a flowchart for discriminating to which of the regions I to VIII certain coordinates (x, y) belong. The discrimination units 54 and 55 discriminate to which of the regions I to VIII of FIG. 5 the first coordinates, the actual second coordinates, and the second coordinates in calculation belong. When the first coordinates are to be discriminated, it is sufficient to substitute (x1, y1) for (x, y) in FIG. 6. When the actual second coordinates are to be discriminated, it is sufficient to substitute (x2, y2) for (x, y) in FIG. 6. When the second coordinates in calculation are to be discriminated, it is sufficient to substitute ($xc_i$, $yc_i$) for (x, y) in FIG. 6.

When x>0 and y>0 at steps S11 and S12, the coordinates (x, y) belong to the region I or II of FIG. 5. Further, it can be found that when x≧y at step 13, the coordinates (x, y) belong to the region I and when x<y, the coordinates (x, y) belong to the region II.

When x>0 and y≦0 at steps S11 and S12, the coordinates (x, y) belong to the region VII or VIII of FIG. 5. Further, it can be found that when |x|≧|y| at step S14, the coordinates (x, y) belong the region VIII and when |x|≦|y| at step S14, the coordinates (x, y) belong the region VII.

When x≦0 and y>0 at steps S11 and S15, the coordinates (x, y) belong to the region III or IV of FIG. 5. Further, it can be found that when |x|≧|y| at step S16, the coordinates (x, y) belong to the region IV and when |x|<|y|, the coordinates (x, y) belong to the region III.

When x≦0 and y≦0 at steps S11 and S15, the coordinates (x, y) belong to the region V or VI of FIG. 5. Further, it can be found that when |x|≧|y| at step S17, the coordinates (x, y) belong the region V and when |x|<|y|, the coordinates (x, y) belong the region VI.

Figure 7A:
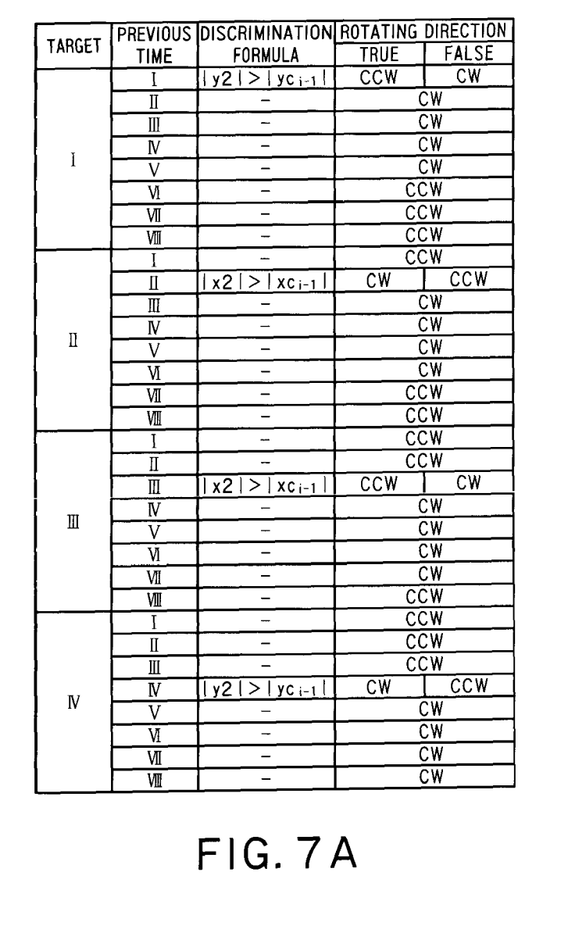
FIGS. 7A and 7B are tables showing the rotating directions (CCW or CW) of the second coordinates in calculation.
Figure 7B:
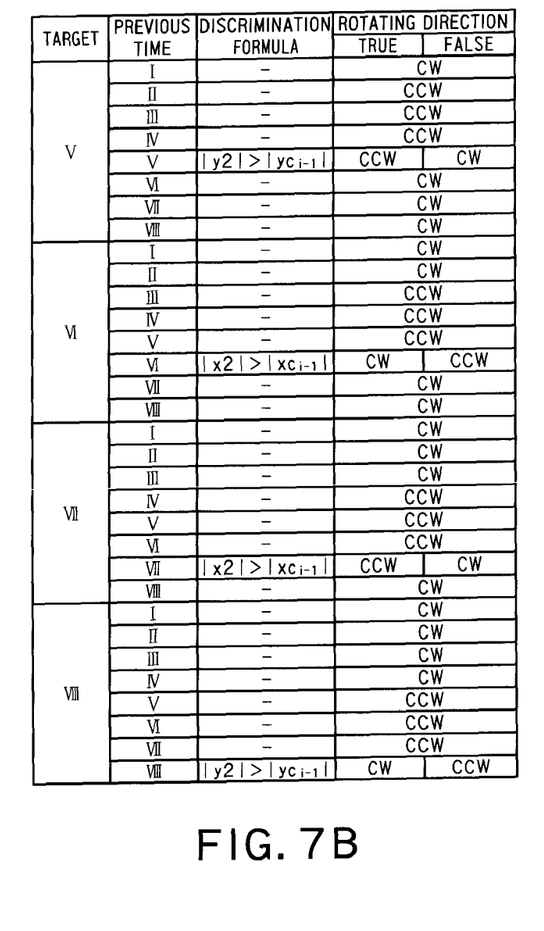

FIGS. 7A and 7B are tables showing the rotating directions (CCW or CW) of the second coordinates in calculation that are prescribed based on the regions which the first coordinates, the actual second coordinates, and the second coordinates in calculation belong to, respectively. The comparator 53 selects the arithmetic operation formula (Expression 1 or 2) to be used by the CORDIC rotation 51 according to the tables of FIGS. 7A and 7B.

The "target" in FIGS. 7A and 7B shows the region to which target actual second coordinates belong. The "previous time" in FIG. 7A and FIG. 7B shows the region to which the second coordinates in calculation ($xc_{i-1}$, $yc_{i-1}$) belong. When, for example, the actual second coordinates belong to the region I and the second coordinates in calculation ($xc_{i-1}$, $yc_{i-1}$) belong to the region II, the comparator 53 selects Expression 2 to rotate the second coordinates in calculation ($xc_{i-1}$, $yc_{i-1}$) to CW direction. As apparent from FIG. 5, when the actual second coordinates belongs to the region I and the second coordinates in calculation ($xc_{i-1}$, $yc_{i-1}$) belong to the region II, it is sufficient to rotate the second coordinates in calculation ($xc_i$, $yc_i$) to CW direction using the second coordinates in calculation ($xc_{i-1}$, $yc_{i-1}$) as a reference to cause the second coordinates in calculation ($xc_i$, $yc_i$) to approach to the actual second coordinates. Accordingly, when the comparator 53 selects expression 2, the CORDIC rotation 52 can approach the second coordinates in calculation to the actual second coordinates.

When the actual second coordinates and the second coordinates in calculation ($xc_{i-1}$, $yc_{i-1}$) belong to the same region, x2 is compared with $xc_{i-1}$ or y2 is compared with $yc_{i-1}$. For example, the actual second coordinates and the second coordinates in calculation ($xc_{i-1}$, $yc_{i-1}$) belong to the region I, y2 is compared with $yc_{i-1}$. When y2>$yc_{i-1}$, the second coordinates in calculation ($xc_i$, $yc_i$) are rotated to CCW direction. That is, the comparator 53 selects Expression 1. When y2<$yc_{i-1}$, the second coordinates in calculation ($xc_i$, $yc_i$) are rotated to CW direction. That is, the comparator 53 selects Expression 2.

The rate of change per angle of a cosine value (x value) is larger than that of a sine value (y value) in the vicinity of an absolute angle of π/2(rad) and in the vicinity of 3π/2(rad) of it. The rate of change per angle of the sine value (y value) is larger than that of the cosine value (x value) in the vicinity of the absolute angle of π/(rad) and in the vicinity of 0(2π) (rad) of it. Accordingly, when the region to which the actual second coordinates and the second coordinates in calculation ($xc_{i-1}$, $yc_{i-1}$) belong are any of the regions I, IV, V, and VIII, y2 is compared with $yc_{i-1}$. When the region to which the actual second coordinates and the second coordinates in calculation ($xc_{i-1}$, $yc_{i-1}$) belong are any of the regions II, III, VI, and VII, x2 is compared with $xc_{i-1}$. With these operations, even if the actual second coordinates and the second coordinates in calculation ($xc_{i-1}$, $yc_{i-1}$) belong to the same region, the comparator 53 can accurately select Expression 1 or 2.

As described above, the discrimination units 54 and 55 can discriminate the regions to which the first coordinates, the actual second coordinates, and the second coordinates in calculation belong, respectively. Further, as explained referring to FIGS. 5, 7A, and 7B, the comparator 53 can select Expression 1 or 2 based on the results of discrimination of the discrimination units 54 and 55.

In the embodiment, the speed detection device 100 calculates the angular speed of the rotor. However, the speed detection device 100 can be also applied to a moving body that carries out a reciprocating motion. In this case, it is sufficient for the speed detection device 100 to use the angular speed calculated by the CORDIC rotation 51 as the speed of the moving body.

According to the embodiment, the speed detection device 100 has pinpoint accuracy because it can detect the rotation angle using only the sine signal and the cosine signal without using division (arctangent) that heretofore deteriorates accuracy in speed detection.

According to the embodiment, the speed detection device 100 carries out calculation to approach the second coordinates in calculation to the actual second coordinates using the four operations excluding division, that is, multiplication, addition, or subtraction as shown in Expression 1 and Expression 2. As a result, since the arithmetic operation circuit of the speed detection device 100 can be arranged relatively simply, and the device can be made small in size in its entirety as well as is made suitable for mass production.

The invention claimed is:
1. A speed detection device for periodically sampling coordinates showing a position of a moving body which carries out a rotating motion or a reciprocating motion and detecting a speed of the moving body based on the coordinates comprising:
 a memory configured to store a plurality of preset tentative angles and values of a trigonometric function corresponding to the plurality of tentative angles;
 a first register configured to store first coordinates of the moving body obtained by a first sampling;
 a second register configured to store actual second coordinates of the moving body obtained by a second sampling subsequent to the first sampling; and
 an arithmetic operation unit configured to calculate second coordinates in calculation by multiplication, addition, or subtraction of the first coordinates and the values of the trigonometric function to approximate the second coordinates in calculation to the actual second coordinates, the arithmetic operation unit further configured to calculate the speed of the moving body based on a tentative angle corresponding to the value of the trigonometric function used to calculate the second coordinates in calculation;
 a discrimination unit configured to discriminate a region to which the first coordinates, the actual second coordinates, and the second coordinates in calculation belong;

a comparator configured to select an expression to be operated by the arithmetic operation unit; wherein the expression is selected based on the region to which the first coordinates, the actual second coordinates, and the second coordinates in calculation belong;

a third register configured to sequentially store the second coordinates in calculation;

a fourth register configured to cumulate tentative angles; wherein the memory is further configured to store $\phi_0$-$\phi_n$ ($\phi_0 > \phi_1 > \phi_2 \ldots \phi n$) (n is natural numbers) as the tentative angles and $\cos \phi_0$ to $\cos \phi_n$ and $\phi_0$ to $\tan \phi_n$ as the values of the trigonometric function;

the arithmetic operation unit is further configured to cumulate Expression 1 or Expression 2, as to the respective values of i in the order of i=0, 1, 2, . . . .

$$xc_i = \cos \phi_i * (xc_{i-1} - yc_{i-1} * \tan \phi_i)$$
$$yc_i = \cos \phi_i * (yc_{i-1} + xc_{i-1} * \tan \phi_i) \quad \text{(Expression 1)}$$

or $$xc_i = \cos \phi_i * (xc_{i-1} + yc_{i-1} * \tan \phi_i)$$
$$yc_i = \cos \phi_i * (yc_{i-1} - xc_{i-1} * \tan \phi_i) \quad \text{(Expression 2)}$$

(where, $\phi_i = \tan^{-1} 2^{-i}$ (i=0,1,2 . . . n), and when i=0, $xc_{i-1} = x1$, $yc_{i-1} = y1$)

where the first coordinates are shown by (x1, y1), the actual second coordinates are shown by (x2, y2), and the second coordinates in calculation are shown by ($xc_i$, $yc_i$);

the comparator is further configured to compare the actual second coordinates (x2, y2) with the second coordinates in calculation (xc, yc) as to the respective values of i and select any one of Expression 1 and Expression 2 to be operated by the arithmetic operation unit, wherein the arithmetic operation unit calculates Expression 1 or Expression 2;

the third register is further configured to store the second coordinates in calculation operated by the arithmetic operation unit as to the respective values of i;

the fourth register is further configured to accumulate the tentative angles used by the second coordinates in calculation as to the respective value of i;

the arithmetic operation unit is further configured to calculate the speed of the moving body based on the accumulated tentative angle stored in the fourth register, when the second coordinates in calculation are nearest the actual second coordinates.

2. A servomotor for periodically sampling coordinates showing the position of a moving body which carries out a rotating motion or a reciprocating motion and detecting the speed of the moving body based on the coordinates comprising:

a memory configured to store a plurality of preset tentative angles and values of a trigonometric function corresponding to the plurality of tentative angles;

a first register configured to store first coordinates of the moving body obtained by a first sampling;

a second register configured to store actual second, coordinates of the moving body obtained by a second sampling subsequent to the first sampling; and an arithmetic operation unit configured to calculate second coordinates in calculation by multiplication, addition, or subtraction of the first coordinates and the values of the trigonometric function to approximate the second coordinates in calculation to the actual second coordinates, the arithmetic operation unit further configured to calculate the speed of the moving body based on a tentative angle corresponding to the value, of the trigonometric function used to calculate the second coordinates in calculation;

a discrimination unit configured to discriminate a region to which the first coordinates, the actual second coordinates, and the second coordinates in calculation belong;

a comparator configured to select an expression to be operated by the arithmetic operation unit; wherein the expression is selected based on the region to which the first coordinates, the actual second coordinates, and the second coordinates in calculation belong;

a third register configured to sequentially store the second coordinates in calculation;

a fourth register configured to cumulate tentative angles; wherein the memory is further configured to store $\phi_0$-$\phi_n$ ($\phi_0 > \phi_1 > \phi_2 \ldots \phi n$) (n is natural numbers) as the tentative angles and $\cos \phi_0$ to $\cos \phi_n$ and $\tan \phi_0$ to $\tan \phi_n$ as the values of the trigonometric function;

the arithmetic operation unit is further configured to cumulate Expression 1 or Expression 2, as to the respective values of i in the order of i=0, 1, 2, . . . .

$$xc_i = \cos \phi_i * (xc_{i-1} - yc_{i-1} * \tan \phi_i)$$
$$yc_i = \cos \phi_i * (yc_{i-1} + xc_{i-1} * \tan \phi_i) \quad \text{(Expression 1)}$$

or $$xc_i = \cos \phi_i * (xc_{i-1} + yc_{i-1} * \tan \phi_i)$$
$$yc_i = \cos \phi_i * (yc_{i-1} - xc_{i-1} * \tan \phi_i) \quad \text{(Expression 2)}$$

(where, $\phi_i = \tan^{-1} 2^{-i}$ (i=0, 1, 2 . . . n), and when i=0, $xc_{i-1} = x1$, $yc_{i-1} = y1$)

where the first coordinates are shown by (x1, y1), the actual second coordinates are shown by (x2, y2), and the second coordinates in calculation are shown by ($xc_i$, $yc_i$);

the comparator is further configured to compare the actual second coordinates (x2, y2) with the second coordinates in calculation (xc, yc) as to the respective values of i and select any one of Expression 1 and Expression 2 to be operated by the arithmetic operation unit, wherein the arithmetic operation unit calculates Expression 1 or Expression 2;

the third register is further configured to store the second coordinates in calculation operated by the arithmetic operation unit as to the respective values of i;

the fourth register is further configured to accumulate the tentative angles used by the second coordinates in calculation as to the respective value of i;

the arithmetic operation unit is further configured to calculate the speed of the moving body based on the accumulated tentative angle stored in the fourth register, when the second coordinates in calculation are nearest the actual second coordinates.

* * * * *